Patented July 29, 1952

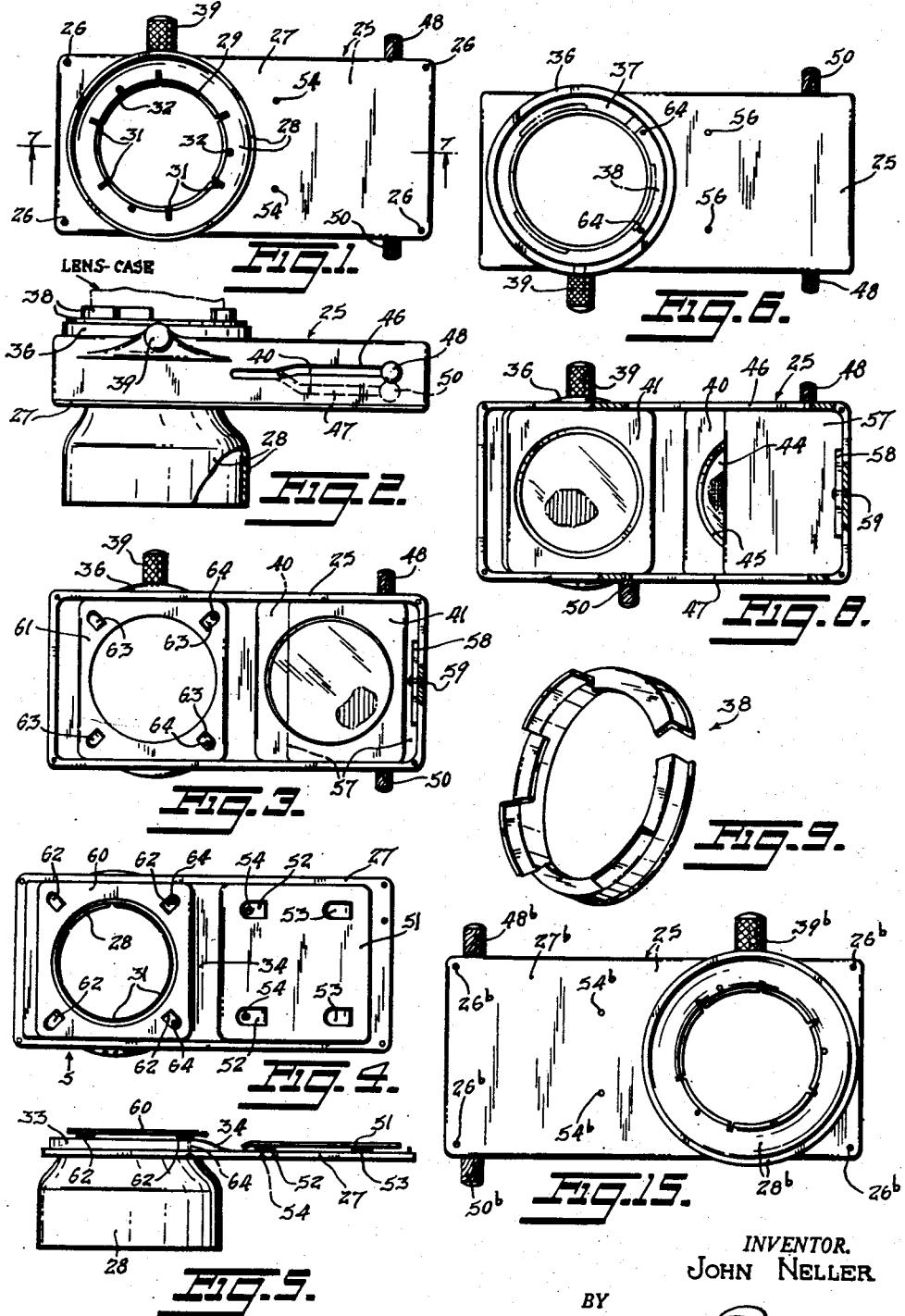

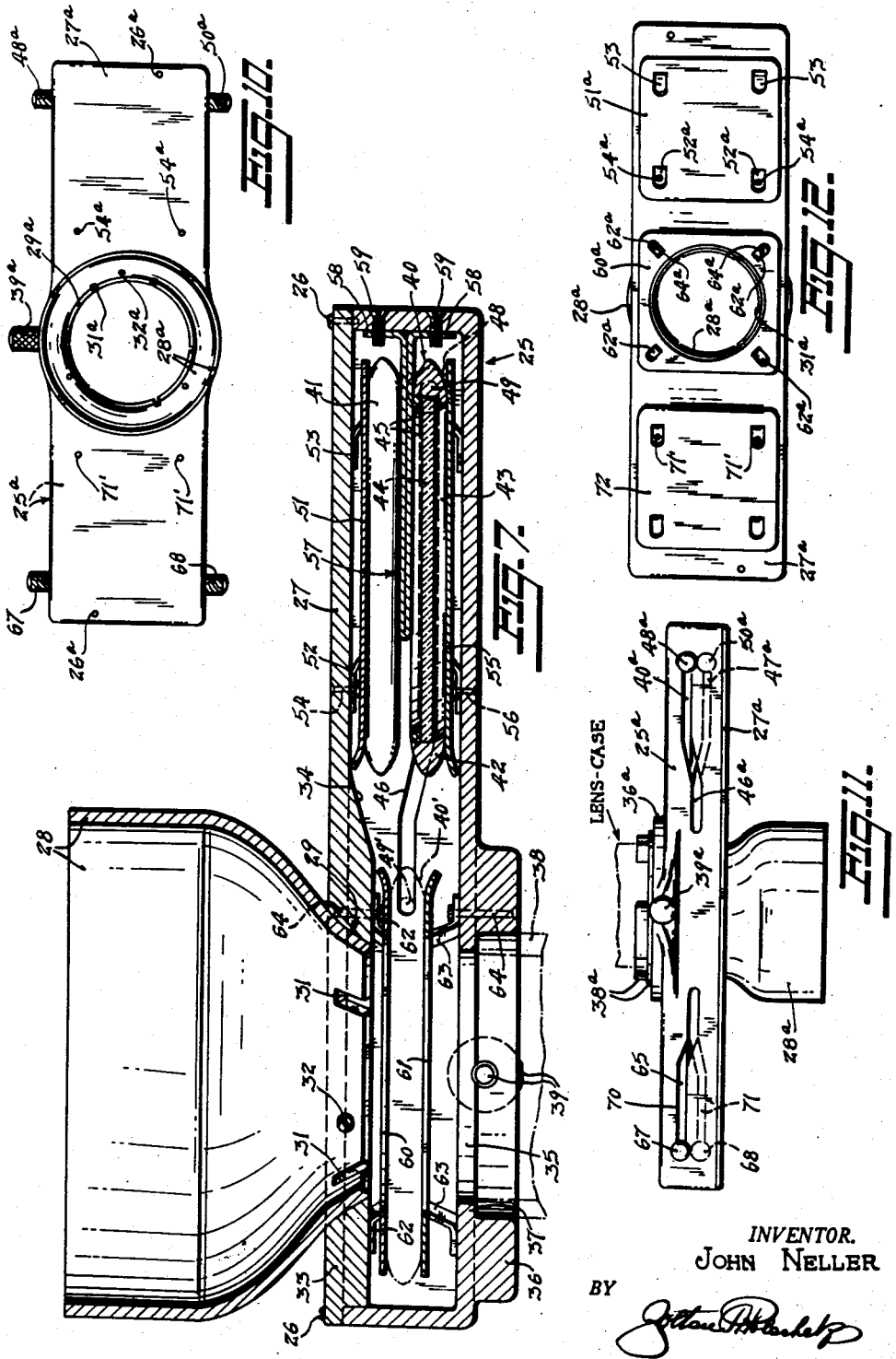

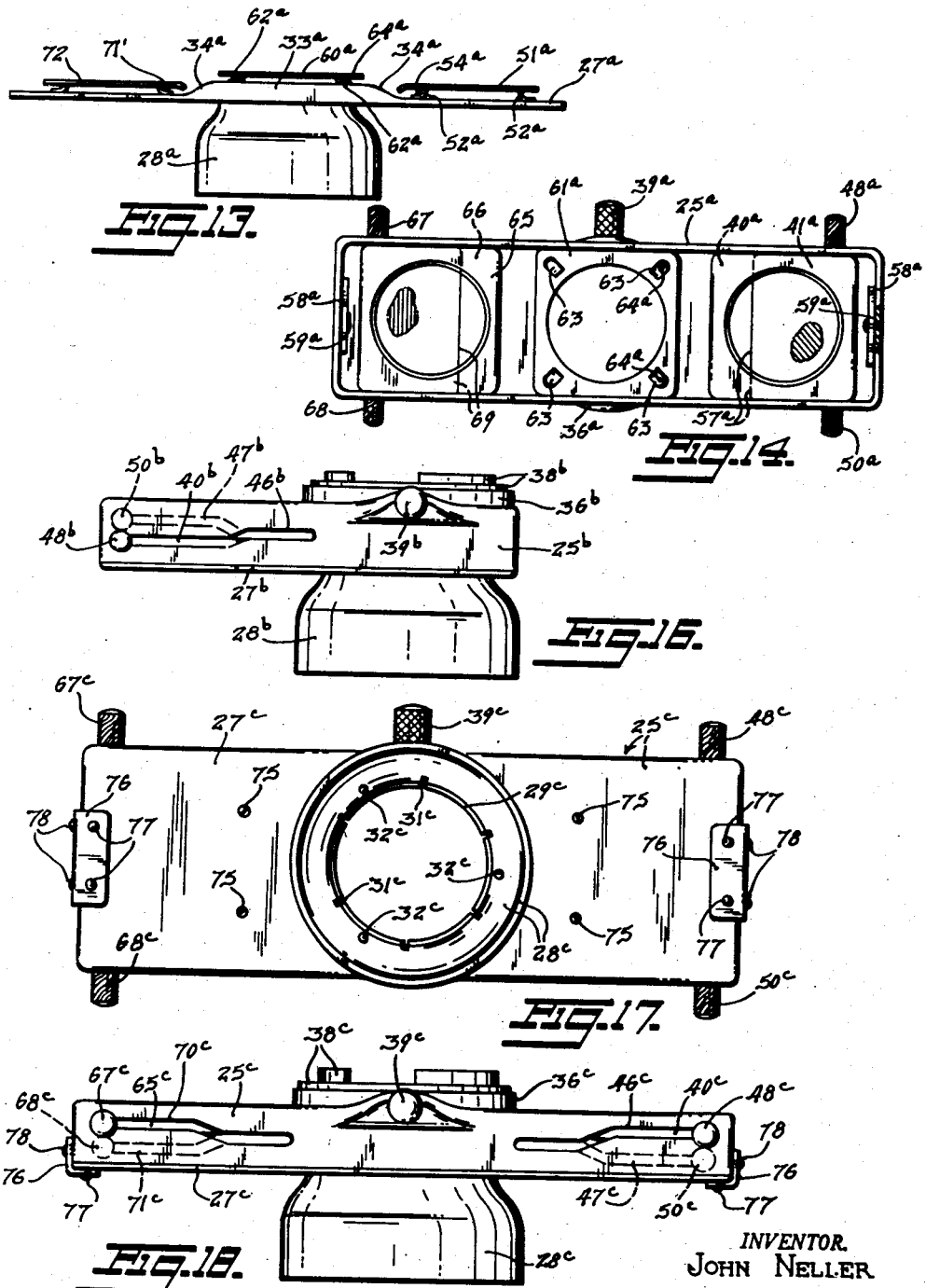

2,604,819

UNITED STATES PATENT OFFICE 2,604,819

COLOR FILTER ATTACHMENT FOR CAMERAS

John Neller, Brooklyn, N. Y.

Application August 13, 1949, Serial No. 110,190

3 Claims. (Cl. 88—113)

This invention relates to new and useful improvements in color-filter attachments for cameras, and, more particularly, the aim is to provide a novel and valuable such attachment for all cameras, whether for making stills or motion pictures.

According to the invention a light-weight, easily separately personally portable, precision type of color-filter attachment yet one of relatively inexpensive construction, is provided, which incorporates a plurality of practicably independently manually shiftable color-filters of different color-filtering capacities each normally in an inoperative location but shiftable at any instant desired to a working location opposite the lens without having concurrently to move any other or others of the filters present.

Special features of the invention, also, are the avoidance of a rotatably mounted carrier for a plurality of filters, characteristically requiring a redesigning of the camera itself, and the avoidance of such complications as a main rectilinearly movable carrier having slidably mounted thereon, for movement in a direction at an angle to the direction of moveability of said main carrier, a minor carrier having spaced along the length thereof the plurality of filters present.

Furthermore, pursuant to the present invention, such unwieldy and over-large arrangements as a slidable carrier for the filters of different light-filtering capacities arranged in line or column along the length of said carrier are done away with.

According to the present invention, two or four, or more, and indeed if desired an odd number total, of different filters may be included in the new attachment, but in such manner, nevertheless, that, while each filter is at will manually movable from normal position or full displacement from the camera lens to perfect registration therewith, and this as already stated without having concurrently to move any other or others of the filters present, when once a selected filter has been even partially moved toward such registry, no other filter can be advanced to said registry.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a front elevational view of a now favored embodiment of the invention, of small size, as for attachment to a still camera, and provided with two individually selectively advanceable filters.

Fig 2 is a top plan view of Fig. 1 with the sun-shade now lowermost.

Fig. 3 is a view similar to Fig. 1, but with the cover-plate removed.

Fig. 4 is an inside elevational view of the cover-plate.

Fig. 5 is a bottom view of the cover-plate, looking in the direction of the arrow 5 of Fig. 4.

Fig. 6 is a rear view of the attachment itself.

Fig. 7 is a very much enlarged longitudinal section, taken on the line 7—7 of Fig. 1.

Fig. 8 is a view similar to Fig. 3, but showing one filter-unit, for example, the one having a red transpicuous glass or pane of other suitable material, as shifted to full registration with the camera lens.

Fig. 9 is a perspective view showing an adapter, also seen in Figs. 2 and 5 and diagrammatically partially indicated in dot and dash lines in Fig. 6, for affixing the attachment to the lens-case of a camera, regardless of quite large variations in the outer diameter of such case.

Fig. 10 is a view similar to Fig. 1, showing an attachment of the aforesaid small size, but incorporating four instead of two filter units.

Fig. 11, a view corresponding to Fig. 2, further illustrates the last-named attachment.

Figs. 12, 13 and 14, also relative to said last-named attachment; these views corresponding, respectively, to Figs. 4, 5 and 3.

Figs. 15 and 16, showing a larger two filter-unit attachment, as for a motion picture camera, are views corresponding, respectively, to Figs. 1 and 2.

Figs. 17 and 18, showing a larger four filter-unit attachment, as likewise for a motion picture camera, also are views corresponding, respectively, to Figs. 1 and 2.

Referring to the drawings more in detail, and first to Figs. 1-9, with prime allusion in many instances to Fig. 7, a box-like elongate casing 25 is closed, as by aid of the screws indicated at 26, by a cover-plate 27; these parts 25 and 27, and the hereinafer referred to frames for the filter units, being preferably of aluminum or the like.

The sun-shade is designated 28, shaped to have its inner conical neck portion 29 seated in a conical recess in the cover-plate 27 the minor diameter of which defines a circular opening through the cover-plate which, matching a like opening 35 through the rear wall of the casing, is to be aligned with the axis of the light bundle to pass through the attachment en route to the camera lens. Said neck portion 29 has a suitable plurality of uniformly spaced slits 31, to facilitate securement in place on the cover-plate at said recess of said neck portion, as by screws 32; the sun-shade 28 being desirably spun of thin sheet steel and then tempered to springiness.

The cover-plate 27 integrally includes a dependent pad 33 of constant rectangular cross-section across the width of the cover-plate, and merging with a ramp portion 34 also of constant cross-section across the width of the cover-plate.

The opening 35 passes concentrically through an annular formation 36 at the underside of the rear wall, and is shaped to provide an annular shoulder 37. Said shoulder is for seating the main continuously arcuate portion of the aforesaid adaptor, 38; there being provided a thumb-screw 39 for having the free end of its shank act constrictingly on the adaptor, thereby to clamp the same securely to the camera's lens-case.

As above two filter-units are shown as included in the embodiment now being described; these units designated 40 and 41. Each of these units is constructed as shown best in Fig. 7, when taken with Fig. 8, in connection with the filter 41. As shown in Fig. 7 in full lines, these filter-units are positioned one adjacent another in their normal positions, out of registry with the camera lens. Either of the said filter-units may be selectively and alone advanced to such registry, as indicated in dot and dash lines at 40' in Fig. 7 in the case of the filter-unit 40. Referring now to the details, as above, of this filter-unit 40, the same comprises a wafer-like frame 42, this generally of square outline, but at its ends parallel to the direction of width of the casing, doubly nosed as shown in Fig. 7. Said frame has a central circular opening bounded on one side by an annular ledge 43, on which is seated the filter 44, as one of red color, as fragmentarily indicated by the hatching in Fig. 3; there being applied a securing annular bezel ring 45.

As part of and perhaps the principal instrumentality of the means for guiding either filter-unit from normal retracted position to working position in registry with the camera lens, along one side wall of the casing 25 is a slot 46 and along the opposite side wall of said casing is a slot 47. From a side of each of the filter-units 40 and 41 are extended, respectively, a knob 48 on a reduced neck element 49 of a diameter matching that of one of said slots, and a knob 50 of like construction having a similar neck element for guided relation with the other of said slots.

A coactant instrumentality of said means is the aforesaid ramp 34.

Further cooperant instrumentalities of said means comprise a plurality of resilient floatingly mounted auxiliary walls in the casing. These various walls, all desirably of very thin and highly tempered sheet steel, will now be described.

One of these almost infinitesimally thin and highly elastic walls 51 is adjacent the outer side of the filter-unit 41. This wall has struck out therefrom four generally like tongues of which two are marked 52 and two 53. The tongues 53 are unattached to the cover-plate 27, but the tongues 52 are attached to the latter, as by the rivets 54. An exactly similar and similarly attached wall 55 is adjacent the other side of the filter-unit 41, and attached at its tongues corresponding to the tongues 52, as by the rivets 56 corresponding to the rivets 54.

In the same columnar line including the walls 51 and 55, is a middle resilient wall 57, this linearly tightly bent on itself at a line transverse to its length and at the midpoint along its length, to provide a two-ply cantilever extended leaf-spring main portion. At the inner end of such cantilever reduced extensions 58 of the blank of which this wall is made are oppositely bent perpendicular to the normal general plane of the main two-ply portion of the wall. By means of the extensions 58, the wall 57 is attached to an end wall of the casing 25, as by a pair of screws 59.

The complement of said resiliently floatingly mounted walls is comprised of a pair thereof for attending the light-bundle openings through the casing. One of the walls 60 is carried by the cover-plate 27 and is exactly like the wall 51, except for the inclusion in the wall 60 of a central circular opening matching the openings through the casing; and the other wall 61 is mounted on the rear wall of the casing and is exactly like the wall 60. These walls are, also, secured to their main supports merely at two of their four tongues, in each case at the tongues 63 nearest the walls 51 and 55; as by suitable rivets, such as indicated at 64.

In operation, and referring now especially to Fig. 7, when either of the filter units 40 and 41 is, accidentally or otherwise, even slightly advanced toward registry with the openings through the casing 25, that unit becomes so canted, at its forward end, due to the generally obliquely extended direction of an intermediate portion of the length of its slot 46 or 47 relative to the terminal portions of such slot, that an attempt then to manually advance a filter-unit to registration with the camera lens, is effectually blocked.

But if that situation be not present, easy and quick snap of a selected filter-unit to such registration, and similarly convenient and expeditious snap back of said filter-unit to its normal retracted position in its stack, is aided in each case, by the coactive function of the ramp 35, and the floatingly mounted status of the walls 51, 55, 57, 60 and 61; with note taken of the fact that along certain sides of these walls they are adapted to have a camming function by virtue of linearly extended lateral bends or curls along said sides.

Nevertheless, the attachment is exceedingly light in weight, of small size, and being elongate, could be carried even in an upper pocket of a vest or waistcoat, comfortably and without notable bulge of the garment.

Referring next to the structure shown in Figs. 10–14, this has its light-bundle passing openings through the casing 25ª, at a mid location along the length of said casing. Elsewhere, throughout this structure as shown herein, the parts to which are applied reference numerals with the suffix *a* added correspond, respectively, to the parts to which have been applied the same reference numerals without such suffix. Such intermediacy of said openings is to allow a plurality of different filter-units to be positioned normally, that is, normally to be retracted to opposite sides of said openings. Here the two filter-units as seen at the left are respectively marked 65 and 66, each having a manipulating knob 67 or 68. For these filter units there are provided an instrumentality 69 like the resilient floatingly mounted wall 57ª; slots like the slots 46ª and 47ª, respectively designated 70 and 71; rivets 71' like the rivets 64; and floating wall instrumentality like the floating walls 51ª.

Referring next to the variation shown in Figs. 15 and 16, this, with merely two filter-units present as in Figs. 1–9, is, although of somewhat but not intolerably larger width and triflingly larger length, and without greater thickness necessarily than in the case of the structure of Figs. 1–9, for use, as already stated, in conjunction with a larger camera lens case, as in a professional motion picture camera. In this structure, in relation to which it will be noted that if the structure of Figs. 1–9 be said to be made to the left hand, the structure now being described may be said to be made to the right hand, the parts to which are applied reference numerals with the suffix b added correspond, respectively, to the parts to which have been applied the same reference numerals but without such suffix.

Referring next to the structure shown in Figs. 17 and 18, wherein the parts to which are applied reference numerals with the suffix c added correspond, respectively, to the parts to which have been applied the same reference numerals without such suffix, this arrangement, as to lens-case adaptability, is like the structure of Figs. 15 and 16, but, as to the employment therein of a plurality of stacks of filter-units, is like the structure of Figs. 10–14. Minor structural variations, only, are indicated as present; such as the use of screws 75, in lieu of the rivets 54ª and 71' of Fig. 10, and L-clips 76 in lieu of the attaching screws 26 of Fig. 1, said clips permanently attached to the cover-plate 27c, as by rivets 77, and being detachably connectable to the casing 25c, as by screws 78.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:

1. In a photographic filter magazine for use as an attachment for a camera, a hollow elongated casing having its front and rear walls formed at one end thereof with aligned openings for the passage of light, adjacent filter-units slidably positioned in said casing at the other end thereof remote from the ends of said front and rear walls formed with said openings, finger pieces extended laterally from said filter-units, said finger pieces being extended from opposite sides of said filter-units to be used for individually sliding said filter-units into position between the openings of said casing, said casing having slots aligned with and extended parallel to said filter-units and through which said finger pieces project for guiding the respective filter-unit when being slid into position between said openings, means for supporting each of said filter-units in the plane substantially midway between the front and rear walls of said casing when advanced into position between said openings, said supporting means comprising walls resiliently mounted on the inner faces of the front and rear walls and midway between the front and rear walls of said casing over said openings, said resiliently mounted walls being formed with openings aligned with the aligned openings of the front and rear walls of said casing, said resiliently mounted walls being spaced a distance equal to the thickness of the filter-units to receive between them said filter-units as they are individually slid into position between said openings adjacent ends of said resiliently mounted walls and said filter-units when positioned at the other end of said casing being spaced to provide clearance for individually moving said filter-units into position between said resiliently mounted walls, said slots being suitably curved at the ends of said resiliently mounted walls adjacent the other end of said casing to guide said filter-units into position between said resiliently mounted walls.

2. In a photographic filter magazine for use as an attachment for a camera, a hollow elongated casing having its front and rear walls formed at one end thereof with aligned openings for the passage of light, adjacent filter-units slidably positioned in said casing at the other end thereof remote from the ends of said front and rear walls formed with said openings, said casing being formed adjacent one side of each of said filter-units with a slot for guiding the respective filter-unit when being slid into position between said openings, a finger piece extended from the side of each of said filter-units and projected through the respective slot of that filter-unit to be used for individually sliding each of said filter-units into position between said openings, and means retaining said filter-units releasably in position in their end of said casing.

3. In a photographic filter magazine for use as an attachment for a camera, a hollow elongated casing having its front and rear walls formed at one end thereof with aligned openings for the passage of light, adjacent filter-units slidably positioned in said casing at the other end thereof remote from the ends of said front and rear walls formed with said openings, said casing being formed adjacent one side of each of said filter-units with a slot for guiding the respective filter-unit when being slid into position between said openings, a finger piece extended from the side of each of said filter-units and projected through the respective slot of that filter-unit to be used for individually sliding each of said filter-units into position between said openings, and means retaining said filter-units releasably in position in their end of said casing, said retaining means comprising a flexible wall between and contacting the adjacent faces of said filter-units and secured at one end to said casing, and flexible walls resiliently mounted on the inner faces of the front and rear walls of said casing and bearing against the outer faces of said filter-units.

JOHN NELLER.

REFERENCES CITED

The following references are of record in the file of this patent:

UNITED STATES PATENTS

| Number | Name | Date |
|---|---|---|
| 1,626,841 | Kelley et al. | May 3, 1927 |
| 1,729,163 | Drew | Sept. 24, 1929 |
| 2,356,668 | Hineline et al. | Aug. 22, 1944 |
| 2,469,891 | Powers et al. | May 10, 1949 |
| 2,482,571 | Arnold | Sept. 20, 1949 |

FOREIGN PATENTS

| Number | Country | Date |
|---|---|---|
| 218,781 | Great Britain | July 17, 1924 |